Patented Sept. 2, 1952

2,609,373

UNITED STATES PATENT OFFICE 2,609,373

MERCAPTO THIAZOLE-SULFUR HALIDE REACTION PRODUCTS

David J. Beaver, Richmond Heights, Mo., assignor to Monsanto Chemical Company, St. Louis, Mo., a corporation of Delaware No Drawing. Application March 26, 1949, Serial No. 83,783

8 Claims. (Cl. 260—302)

This invention relates to new compositions of matter and to methods of making same. More particularly it relates to the addition products of sulfur halides and mercapto thiazoles.

It has been found in accordance with this invention that a new and novel family of compounds possessing useful properties may be prepared by the addition of a sulfur halide to a free mercapto thiazole. The new compounds are of unknown composition but are believed to be the double salt of a complex substance which may be identified as the tetrasulfide of a thiazole. The double salt may be represented by the general formula

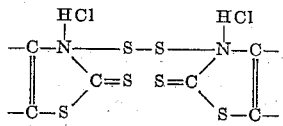

where the unsaturated group which links the nitrogen and sulfur atoms in each thiazole nucleus may be part of an olefinic nucleus, as for example in a thiazole such as 4,5-dimethyl thiazole, or an aromatic nucleus, as for example in benzothiazole and in naphthothiazole, and their substituted analogues and homologues. However, the present invention is not limited to any assumption as to chemical structure but pertains broadly to the addition product of a sulfur halide and a mercapto thiazole.

The new compounds are readily prepared by merely mixing a sulfur halide, such as sulfur monochloride or sulfur monobromide, with a mercapto thiazole in the absence of a solvent at temperatures below the melting point of the mercapto thiazole.

As exemplary of the invention the following is illustrative and is not to be construed as limitative thereof.

EXAMPLE 1

118.5 parts by weight (substantially 0.71 mol) of mercaptobenzothiazole and 50 parts by weight (substantially 0.37 mol) of sulfur monochloride were mixed in a suitable reaction vessel. The temperature rose rapidly to 75° C. and a brown tarry liquid developed which on cooling gradually set to a yellow-brown brittle resin-like material. This product was insoluble in toluene and believed to be a compound of the formula

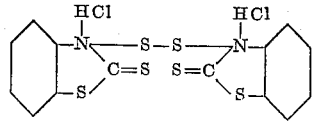

The material exhibited good stability for upon applying a vacuum of 4 mm. for four hours at 20°–50° C. there was substantially no loss in weight. Prolonged heating of the addition product at a relatively high temperature resulted in the evolution of hydrogen chloride. The total loss in weight was 15.6% (percent by weight of hydrogen chloride theoretically present). The residue was identified as a tetrasulfide of benzothiazole having a melting point of 119°–121° C. and possessing by weight substantially 50.0% sulfur and 6.8% nitrogen. This hydrogen chloride-free residue is described and claimed as a vulcanization accelerator in co-pending application Serial No. 61,897 filed November 24, 1948.

As exemplary of the utility of the mercaptothiazole-sulfur halide addition products, the above prepared compound was incorporated in a synthetic rubber stock comprising Stock A—
| | parts by weight |
|---|---|
| Butadiene-1,3-styrene copolymer [1] | 100. |
| Carbon black | 40. |
| Zinc oxide | 3. |
| Sulfur | 1. |
| Resin-like addition product of Example 1 | 2.5 |

[1] GR–S rubber.

The above synthetic rubber stock so compounded was vulcanized in the usual manner by heating in a press for various periods of time at 142° C. The physical data of the cured rubber stocks are set forth below:

Table I

| Minutes Cure at 142° C. | Modulus in lbs./in.$^2$ at Elongation of 300% | Ultimate Tensile in lbs./in.$^2$ | Ultimate Elongation Percent |
|---|---|---|---|
| 15 | 275 | 590 | 590 |
| 30 | 765 | 1,785 | 580 |
| 45 | 1,120 | 2,530 | 560 |

The appearance and physical properties of the vulcanizates were good.

As further exemplary of these new compounds the following is illustrative.

EXAMPLE 2

36.3 parts by weight (substantially 0.25 mol) of a 15:85 weight ratio mixture of 2-mercapto-4-ethyl thiazole and 2-mercapto-4,5-dimethyl thiazole and 16.9 parts by weight (substantially 0.125 mol) of sulfur monochloride were mixed in a suitable reaction vessel. The temperature rose rapidly to 107° C. and a dark liquid mass developed which on cooling below 70° C. solidified and gave 53.2 parts by weight of a black brittle resin-like product insoluble in toluene and believed to be a 15:85 weight ratio mixture respectively of

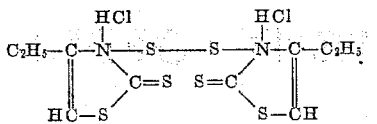

and

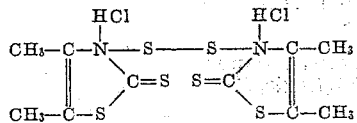

This resin-like product exhibited accelerating activity in a synthetic rubber stock.

While the invention broadly contemplates sulful halide-mercapto thiazole addition products, a particularly useful group is represented by the addition product of one mol of sulfur monochloride and two mols of a 2-mercapto arylene thiazole. As exemplary of the mercapto arylene thiazoles other than the above described are 2-mercapto-4-methyl benzothiazole, 2-mercapto-4,6-dimethyl benzothiazole, 2-mercapto-4-chloro benzothiazole, 2-mercapto-6-phenyl benzothiazole, and 2-mercapto-6-ethoxy benzothiazole. These addition products are valuable vulcanization accelerators for synthetic rubbers such as the butadiene-1,3-styrene copolymers and butadiene-1,3-acrylonitrile copolymers.

While the invention has been illustrated by reference to specific embodiments of the invention, it will be apparent that many variations may be made from the specific examples and procedures described and from the particular reactants and reaction conditions specifically shown without departing from the spirit or scope of the invention.

What is claimed is:

1. As a new composition of matter the addition product of one molecular proportion of a sulfur monohalide and two molecular proportions of a free 2-mercapto thiazole obtained by reacting said reagents in the absence of a solvent at a temperature below the melting point of the mercapto thiazole.

2. As a new composition of matter the addition product of one molecular proportion of a sulfur monochloride and two molecular proportions of a free 2-mercapto arylene thiazole obtained by reacting said reagents in the absence of a solvent at a temperature below the melting point of the mercapto thiazole.

3. As a new composition of matter the addition product of one molecular proportion of sulfur monochloride and two molecular proportions of 2-mercaptobenzothiazole obtained by reacting said reagents in the absence of a solvent at a temperature below the melting point of the mercapto thiazole.

4. As a new composition of matter the addition product of one molecular proportion of sulfur monochloride and two molecular proportions of 2-mercapto-4,5-dimethyl thiazole obtained by reacting said reagents in the absence of a solvent at a temperature below the melting point of the mercapto thiazole.

5. The method of making the composition of claim 1 which comprises reacting a sulfur halide and a free 2-mercapto thiazole in the absence of a solvent at a temperature below the melting point of the 2-mercapto thiazole without substantial elimination of hydrogen halide.

6. The method of making the composition of claim 2 which comprises reacting a sulfur chloride and a free 2-mercapto arylene thiazole in the absence of a solvent at a temperature below the melting point of the 2-mercapto arylene thiazole without substantial elimination of hydrogen chloride.

7. The method of making the composition of claim 3 which comprises reacting substantially one molecular proportion of sulfur monochloride and substantially two molecular proportions of 2-mercaptobenzothiazole in the absence of a solvent at a temperature below the melting point of said thiazole without substantial elimination of hydrogen chloride.

8. The method of making the composition of claim 4 which comprises reacting substantially one molecular proportion of sulfur monochloride and substantially two molecular proportions of 2-mercapto-4,5-dimethyl thiazole in the absence of a solvent at a temperature below the melting point of said thiazole without substantial elimination of hydrogen chloride.

DAVID J. BEAVER.

REFERENCES CITED

The following references are of record in the file of this patent:

UNITED STATES PATENTS

| Number | Name | Date |
|---|---|---|
| 1,661,998 | Carson | Mar. 6, 1923 |

FOREIGN PATENTS

| Number | Country | Date |
|---|---|---|
| 382,940 | Great Britain | Oct. 31, 1932 |